(12) United States Patent
Seevers

(10) Patent No.: US 7,551,060 B1
(45) Date of Patent: Jun. 23, 2009

(54) FEEDBACK DEVICE

(75) Inventor: Daniel B. Seevers, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 175 days.

(21) Appl. No.: 11/254,154

(22) Filed: Oct. 19, 2005

(51) Int. Cl.
*G08B 3/00* (2006.01)
*G08B 25/08* (2006.01)
*G06Q 20/00* (2006.01)

(52) U.S. Cl. .................. 340/384.1; 340/384.5; 340/692; 340/7.62; 705/16; 705/23

(58) Field of Classification Search ................ 340/384.1
See application file for complete search history.

(56) References Cited

U.S. PATENT DOCUMENTS 6,281,796 B1 * 8/2001 Canipe et al. ............ 340/572.3
6,330,973 B1 * 12/2001 Bridgelall et al. ......... 235/462.45
2003/0018477 A1 * 1/2003 Hinde ........................ 704/273

* cited by examiner

*Primary Examiner*—Donnie L Crosland
(74) *Attorney, Agent, or Firm*—Paul W. Martin

(57) ABSTRACT

A feedback device 1 including an interface 2 for receiving a first signal 3 from a point of sale console 4. A processor 5 is responsive to signal 3 for selectively defining a second signal, in the form of an inaudible ultrasonic transmission 6. An output, in the form of an ultrasonic transducer 7, is responsive to processor 5 for propagating transmission 6 to provide only in a predetermined spatially defined transmission zone 8 an audible signal 9 indicative of signal 3. Signal 9 is substantially inaudible outside of zone 8.

15 Claims, 5 Drawing Sheets

FEEDBACK DEVICE

FIELD OF THE INVENTION

The present invention relates to a feedback device.

The invention has been primarily developed for communicating an audible signal to an operator of a point of sale console. However, the invention is by no means restricted to that field of use, and has various alternate applications.

BACKGROUND

Any discussion of the prior art throughout the specification should in no way be considered as an admission that such prior art is widely known or forms part of common general knowledge in the field.

Retail venues typically make use of one or more point of sale (POS) consoles to facilitate the processing of consumer transactions. Typically, a consumer collects one or more consumer items from within the retail venue, and presents these to an operator of a POS console for processing. The console includes an identification system for obtaining identification information from the item or items, such as a barcode scanner or RFID reader. The console also includes a processor for validating the identification information to obtain product pricing information from a data source, and for totaling an account to be paid by the consumer.

It is typically preferable to implement POS consoles with a high throughput capability. That is, POS consoles with the ability to process a large number of items in a relatively short amount of time. This is achieved by utilizing efficient and reliable identification technology, such as bi-optic barcode scanners. To assist in improving throughput, it is common for a POS console to provide an operator with an audible tone indicative of an item being read, or in some cases correctly read and validated. For example: a first tone is produced each time an item is correctly read and validated, and an audibly distinct second tone is produced each time the console experiences a problem in validation. As such, the operator is—at least in theory—able to conveniently identify if and when an item is not correctly processed.

In large supermarkets, numerous POS consoles are arranged in adjacent lanes. This often creates difficulties for operators in recognizing and reacting to audible tones. For example, an operator of a first POS console mistakenly relies or acts upon a tone from a second POS terminal. Further, the continuous repetition of monotonous tones arguably detracts from a consumer's retail shopping experience.

SUMMARY

It is an object of the present invention to overcome or ameliorate at least one of the disadvantages of the prior art, or to provide a useful alternative.

In accordance with a first aspect of the invention, there is provided a feedback device including:

an interface for receiving a first signal from a point of sale console;

a processor responsive to the first signal for selectively defining a second signal; and an output responsive to the processor for propagating the second signal to provide only in a predetermined spatially defined transmission zone an audible signal indicative of the first signal.

In some embodiments the point of sale console is a barcode scanner. In other embodiments the point of sale console includes a barcode scanner in conjunction with other components.

Preferably, the output is an ultrasonic transducer. More preferably the second signal is an inaudible ultrasonic transmission, and the transducer outputs this ultrasonic transmission such that inherent properties of air within the transmission zone distort the ultrasonic transmission to provide the audible signal. Even more preferably, the audible signal is substantially inaudible outside of the transmission zone.

In some embodiments the transducer is mounted to the console. However, in other embodiments, the transducer is spaced apart from the console.

Typically, the console is operated from a control station defined in three-dimensional space, and the transmission zone includes at least part of the control station. Preferably the console and a second console having a second control station are located within a common checkout zone, and the audible signal is not audible in the second control station.

In a preferred embodiment, the console includes a scanner for reading identification tags, and the first signal is indicative of an identification tag having been read. Preferably, the console includes a processing unit for validating the identification tag, and the first signal is indicative of the tag having been read and validated. More preferably the validation results in an approval or a rejection, and the audible signal is indicative of the approval or the rejection.

In some embodiments the first signal identifies a product and the audible signal is an advertisement related to the product.

According to a second aspect of the invention, there is provided a method for providing feedback from a point of sale console, the method including the steps of:

receiving a first signal from the point of sale console;

being responsive to the first signal for selectively defining a second signal; and propagating the second signal to provide only in a predetermined spatially defined transmission zone an audible signal indicative of the first signal.

According to a further aspect of the invention, there is provided a scanner including:

an interface for receiving a first signal from a point of sale console;

a processor responsive to the first signal for selectively defining a second signal; and an output responsive to the processor for propagating the second signal to provide only in a predetermined spatially defined transmission zone an audible signal indicative of the first signal.

In some embodiments the scanning includes barcode recognition. In other embodiments the scanning includes RFID tag interrogation.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Figure 1:
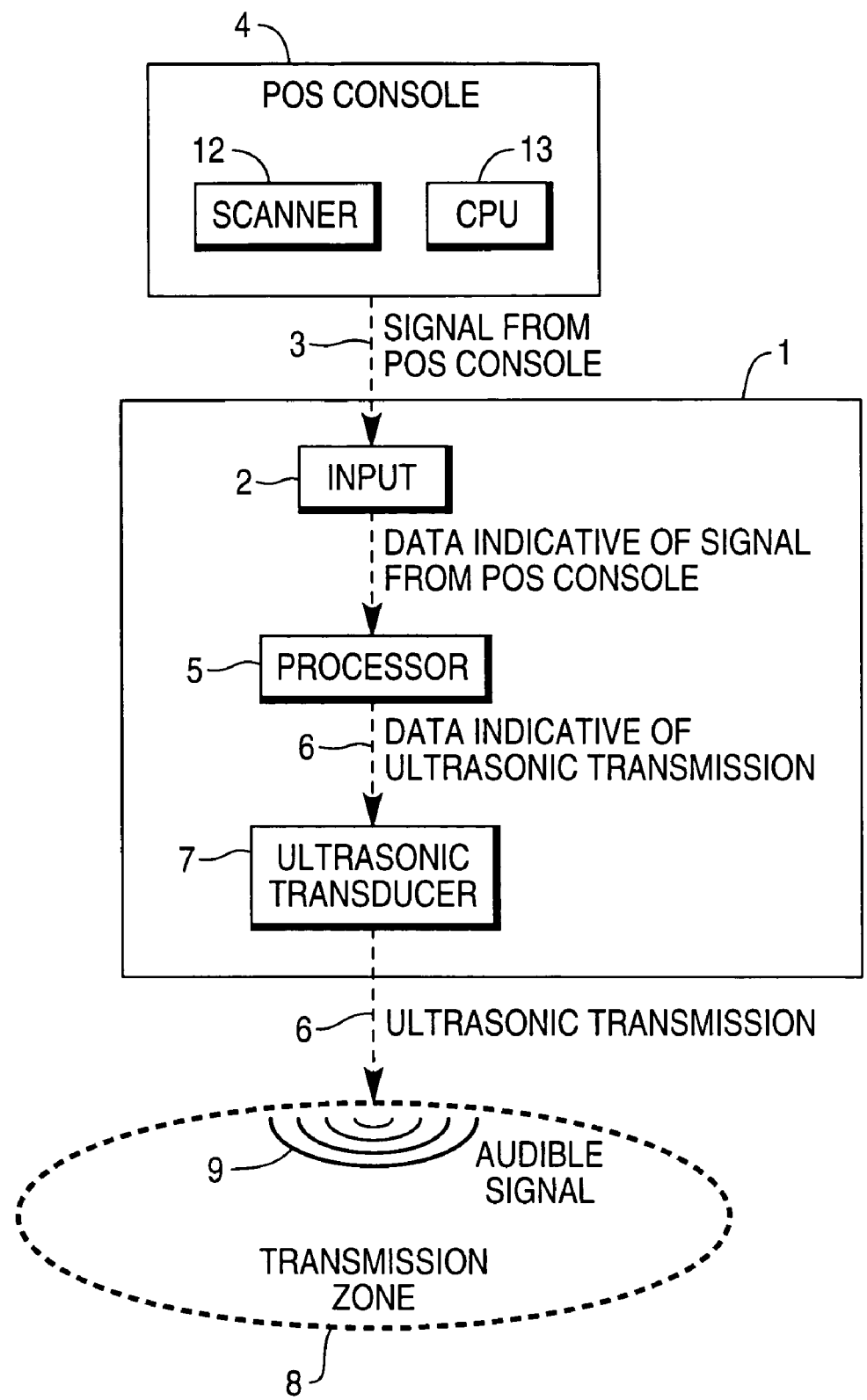
FIG. 1 is schematic representation of a feedback device according to the present invention.

Referring to the drawings, it will be appreciated that, in the different figures, corresponding features have been denoted by corresponding reference numerals.

FIG. 1 illustrates a feedback device 1 including an interface 2 for receiving a first signal 3 from a point of sale console 4. A processor 5 is responsive to signal 3 for selectively defining a second signal, in the form of an inaudible ultrasonic transmission 6. An output, in the form of an ultrasonic transducer 7, is responsive to processor 5 for propagating transmission 6 to provide only in a predetermined spatially defined transmission zone 8 an audible signal 9 indicative of signal 3. Signal 9 is substantially inaudible outside of zone 8.

In the present embodiment transducer 7 outputs transmission 6 such that inherent properties of air within zone 8 distort transmission 6 to provide signal 9. This will be recognized as a utilization of hypersonic sound. In other embodiments, alternate hypersonic transmission techniques are used to substantially limit the audibility of signal 9 to the space defined within zone 8. Those skilled in the art will recognize such techniques, and understand how they are used in alternate embodiments of the invention. The underlying rationale is that a directed and substantially focused beam of sound is created to define zone 8 such that signal 9 is audible only in zone 8. The theory, mathematics and engineering of such sound transmission systems falls beyond the scope of this disclosure, and it will be appreciated that known hardware is typically used for the purposes of transducer 7, and known hardware and/or software is used to achieve certain functionalities of processor 5.

Figure 4:
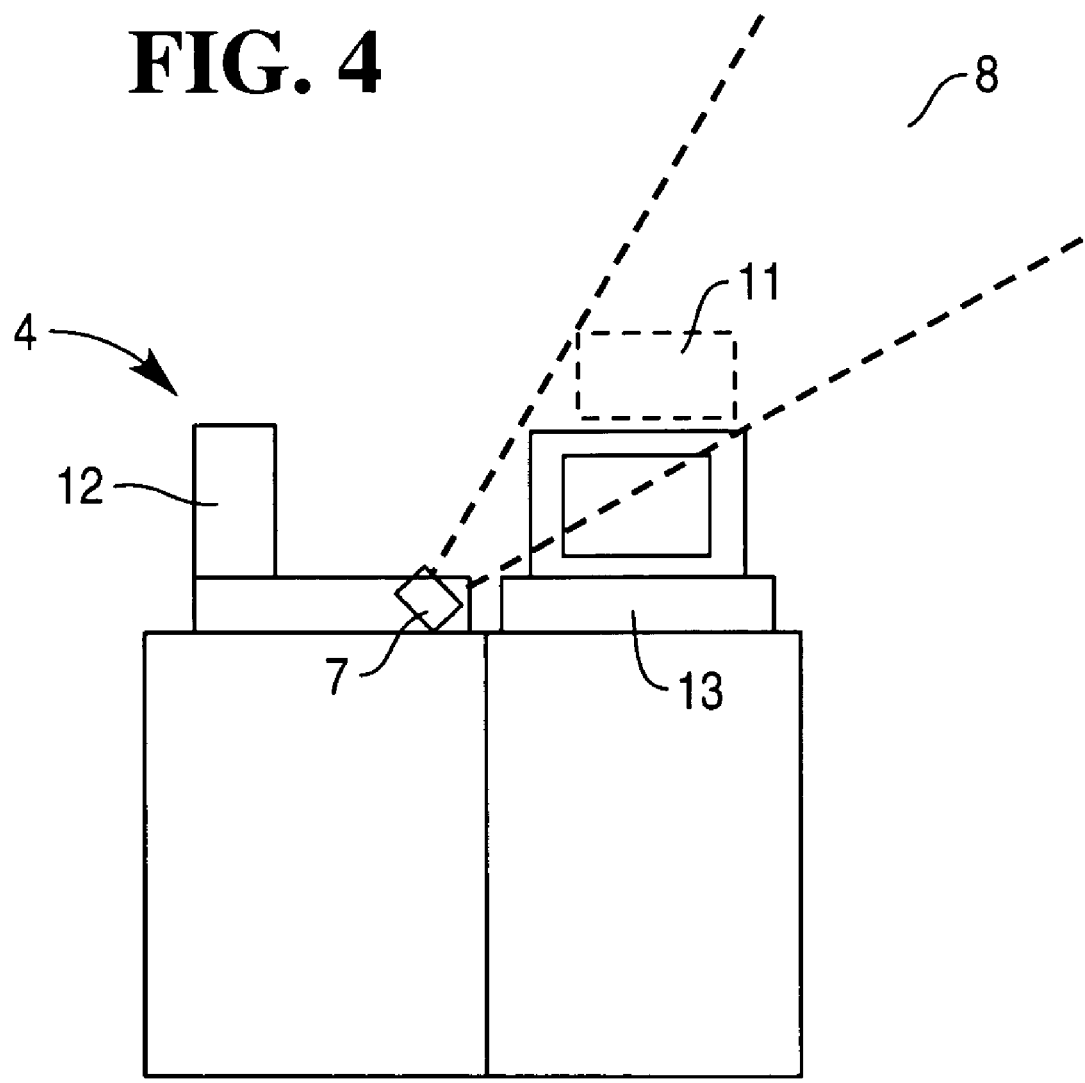
FIG. 4 is a schematic side view of an alternate checkout zone.

In the illustrated embodiment, device 1 is implemented in a retail supermarket to provide feedback to an operator 10 of console 4. Operator 10 interacts with console 4 from within a control station 11 defined in three-dimensional space. This control station is notionally defined by the space an averagely sized operator 10 would occupy in conventional use of console 4. In some embodiments the station 11 is notionally defined in a different manner—for example being based on the typical location of the ears of operator 10, as shown in FIG. 4. Importantly, zone 8 and station 11 functionally overlap. That is, operator 10 is able to hear signal 9 whilst using console 4. In some cases an adjustment mechanism is provided to fine tune the definition of station 11 and zone 8 for operators having particular height characteristics.

Figure 2:
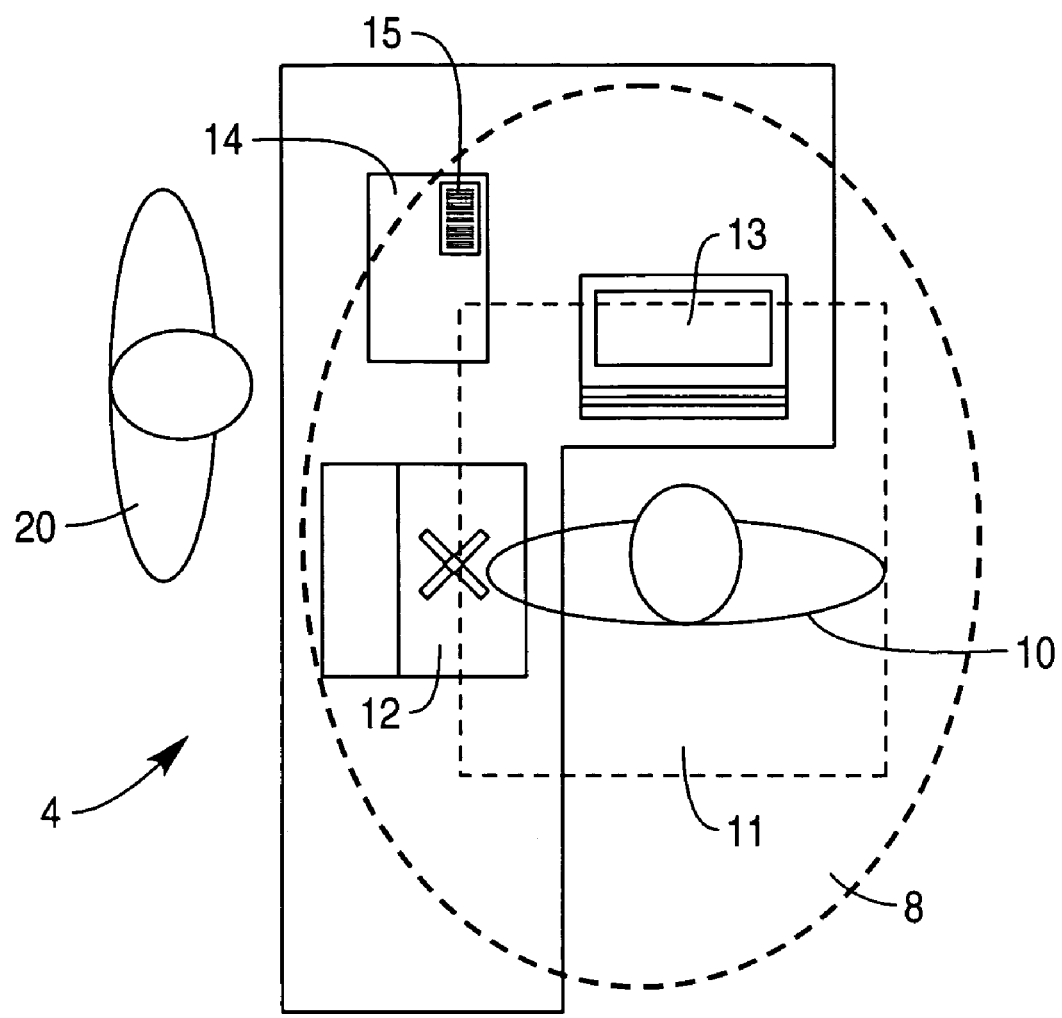
FIG. 2 is a schematic plan view of a supermarket checkout zone including the device of FIG. 1.
Figure 3:
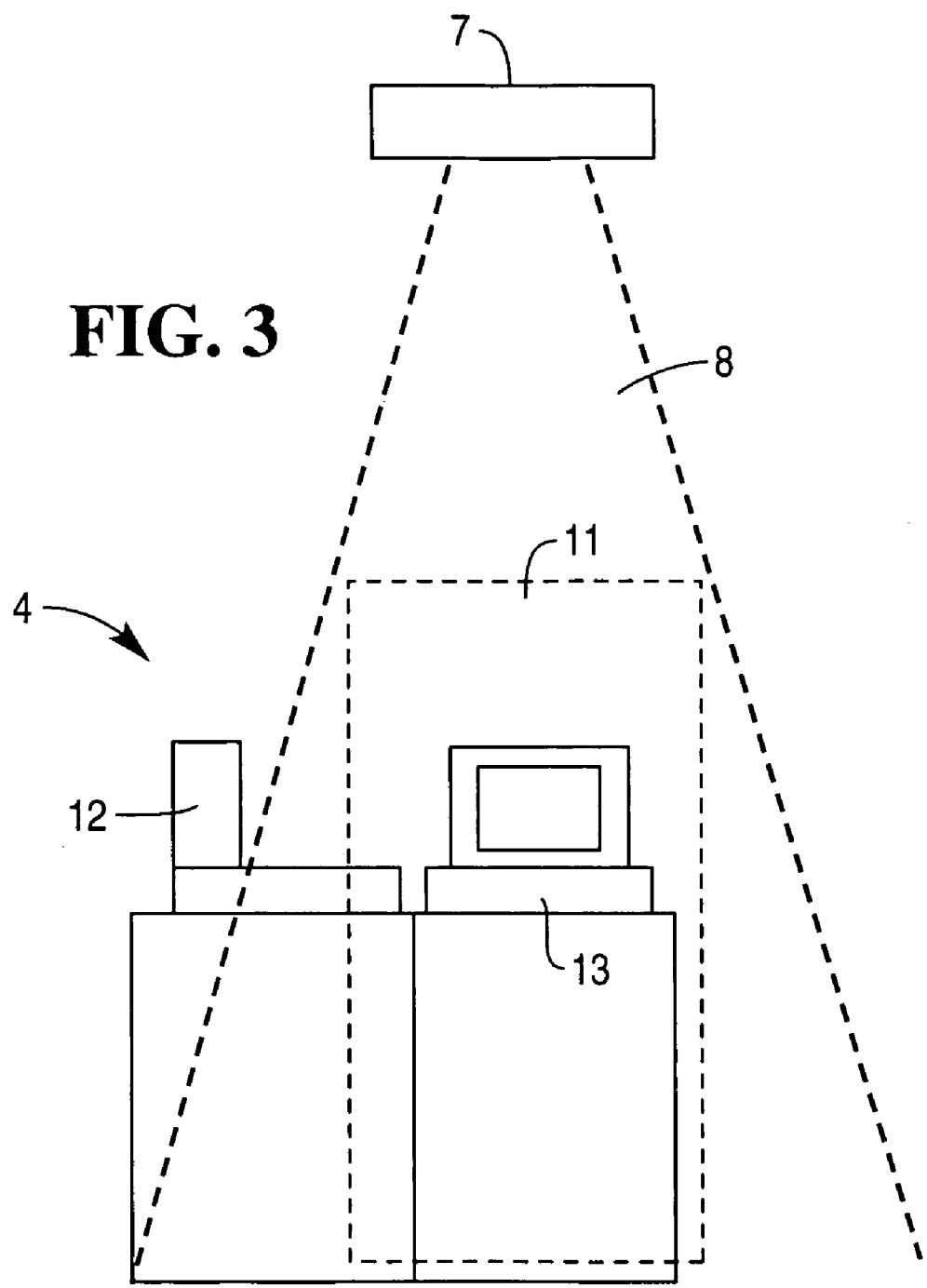
FIG. 3 is a schematic side view of the checkout zone of FIG. 2

In the embodiment of FIGS. 2 and 3, transducer 7 is spaced apart from console 4. In particular, transducer 7 is ceiling mounted substantially vertically above station 11. In other embodiments, such at that shown in FIG. 4, transducer 7 is mounted to the console. FIG. 4 shows a transducer 7 mounted to a bi-optic scanner 12 and substantially directed towards the conventional location of the head of operator 10. As such, station 11 is defined as the region the head of operator 10 occupies during conventional use. In this example, transducer 7 is rotatably mountable to console 4 to allow adjustment of zone 8 for stations 11 defined by operators of varying heights. It will be recognized that generally upward path defined by zone 8 should not include regions occupied by the ears of nearby consumers and/or operates, and as such those consumers and/or operators do not hear signal 9.

It will be appreciated that the positioning of transducer 11, the selection of zone 8, and the definition of station 11 are all interlinked.

Typically, console 4 and a plurality of other similar consoles having a respective control stations are located within a common checkout zone, and signal 9 is only audible in the control station to which it relates.

The total dimensions of zone 8 differ between embodiments. In the embodiment of FIG. 3, zone 8 closely matches station 11. In other embodiments it is enlarged for audibility by a consumer 20. Typically it is preferable to retain zone 8 at a size where signal 9 is not audible to operators of additional consoles.

Consumer 20 presents to operator 10 a consumer item 14 having a barcode 15, and operator 10 passes item 14 through a scanning zone defined by a bi-optic scanner 12 to read barcode 15. In other embodiments alternate identification techniques are used, such as RFID tagging or other types of barcode scanner. For example: an RFID reader replaces scanner 12, and a RFID tag replaces barcode 15. Item 14 is moved through an interrogation zone defined by the RFID reader for the identification purposes.

The precise definition of console 4 is dependant on the functionality of device 1. For example, in some embodiments device 1 provides feedback solely in relation to scanner 12. In such cases scanner 12 solely defines console 4. That is, console 4 is a bi-optic scanner. In other embodiments console 4 is defined by scanner 12 in communication with a CPU 13.

In some embodiments interface 2 is integrated into scanner 12 or CPU 13. In such cases, signal 3 and signal 6 are often the same. That is, console 4 is inherently adapted for operation with device 1. The present embodiment is directed towards an example where console 4 is pre-existing and subsequently adapted for integration with device 1. For example, console 4 makes use of a standard audio speaker, and communication wires typically providing a signal to that speaker are instead connected to interface 2.

It will be appreciated that generic descriptions of retail checkout systems are provided herein for the purposes of illustration only. Other such systems are used in alternate embodiments. That is, the disclosed systems should not be regarded as limiting in any way. For example, in some embodiments barcode 15 inherently carries pricing information. This is particularly appropriate where 2D barcodes are used, and it will be appreciated that these require suitably adapted scanning equipment. Disclosure of generic systems is provided to illustrate exemplary interactions between device 1 and these systems.

In embodiments where console 4 is defined by scanner 12, signal 3 is indicative of barcode 15 being read, and signal 9 is an audible tone indicating such a result. For example, each time a barcode 15 is read by scanner 12, a "beep" is produced in zone 8 by transducer 7. By advantageous selection of zone 8, this beep is heard exclusively by operator 10. If operator 10 passes item 14 past scanner 12 and a beep is not heard, the operator knows with relative certainty that scanning was not successful. In known checkout zones operators are able to hear such beeps from nearby scanners, and often inadvertently believe an item was scanned correctly when indeed it was not. Using device 1, operator 10 is knows with greater certainty that any beep heard is caused by the scanner 12 that he or she is operating.

Figure 5:
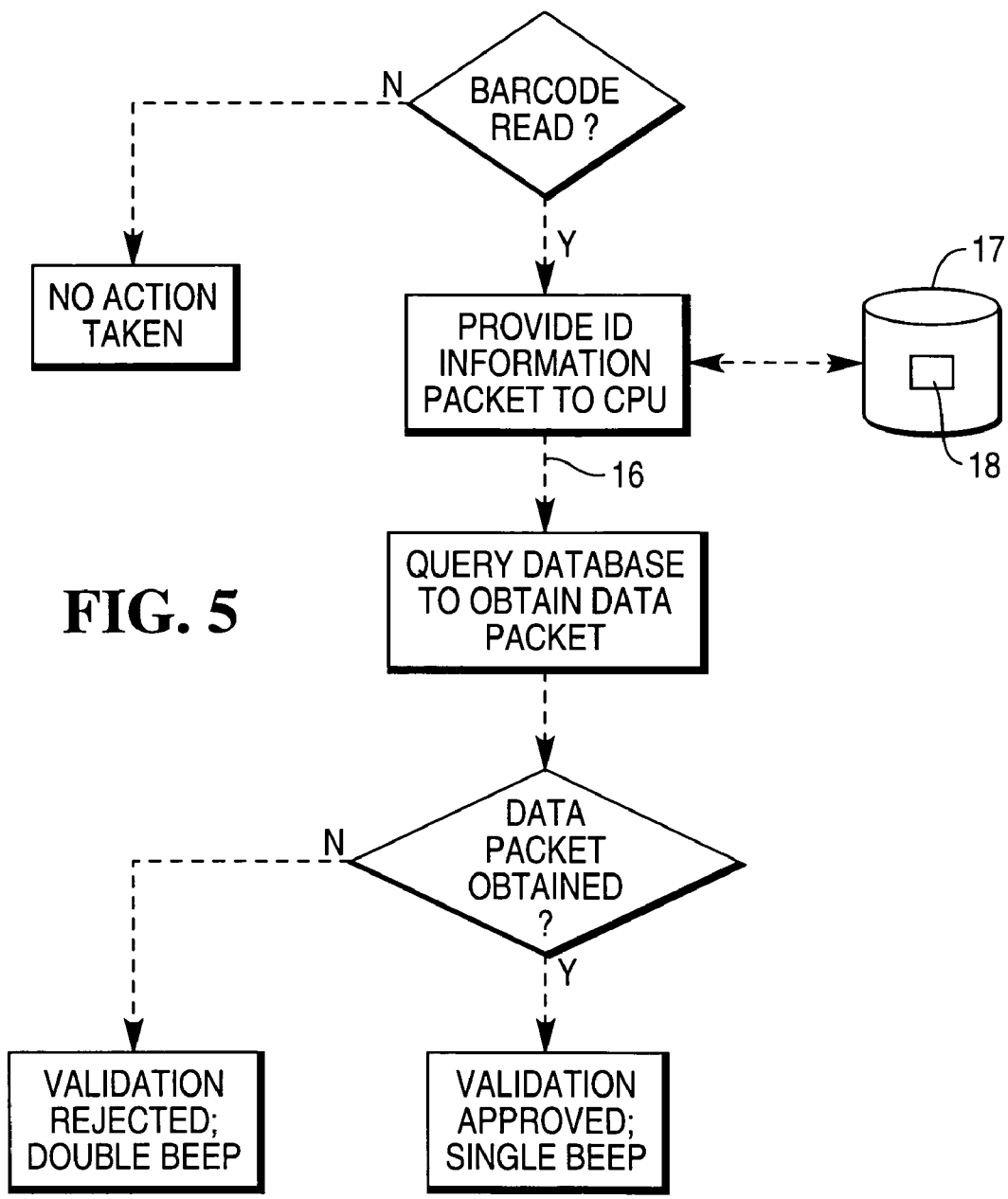
FIG. 5 is a flowchart showing a relationship between validation and feedback.

In embodiments where scanner 12 and CPU 13 collectively define console 4, some additional steps are typically taken to ensure that barcode 15 is not only correctly read, but that the reading produces an acceptable result in a practical sense. This is schematically illustrated in FIG. 5. Where scanner 12 is able to read barcode 15, an identification information packet 16 is provided to CPU 13. Packet 16 is a digital representation of the data read from barcode 15. CPU 13 has access to an information repository in the form of database 17. This database associates identification information packets with respective data packets 18, which include data indicative of product descriptions and pricing information. Upon receipt of packet 16, CPU 13 validates packet 16. The term "validation" refers to a process whereby CPU 13 performs a query to determine whether database 17 associates packet 16 with a packet 18. Where a packet 18 is found, the validation results in an approval. Where a packet 18 is not found, the validation results in a rejection.

In the case of approval, packet 18 is obtained for the purposes of raising an invoice for the sale of item 14. In a simple case, item 14 is moved past scanner 12, and CPU 13 adds the predetermined retail price of item 14 to an invoice.

There are three distinct possible outcomes of passing item 14 through the scanning zone of scanner 12:

Barcode 15 is not read by scanner 12—outcome A.
Barcode 15 is read by scanner 12, and validation by CPU 13 results in approval—outcome B.
Barcode 15 is read by scanner 12, and validation by CPU 13 results in rejection—outcome C.

It will be appreciated that in some implementations there are other possible outcomes. The three above are selected for the purpose of convenient illustration. In embodiments where scanner 12 solely defines console 4, only outcomes A and B are considered, noting that there is no concept of approval or rejection in such cases. How the teachings below are applied to such cases should be apparent.

Signal 3 is indicative of whether outcome B or C is realized. In the present embodiment the signal is provided by CPU 13, however in other embodiments an alternate component of console 14 provides the signal. For example: an integrated scanner.

For the sake of the present example, signal 9 is in the form of a tone identifying whether outcome B or C is realized. For the sake of example, a signal 9 is a "single beep" in the case of outcome B, and a "double beep" in the case of outcome C. It will be appreciated that signal 9 is not produced for outcome A. In practice, operator 10 moves item 14 past scanner 12 in an attempt to scan. Operator 10 is automatically and substantially immediately informed via signal 9 whether this attempted scanning was successful. In particular:

If no tone is heard, operator 10 re-scans the item. If re-scanning is unsuccessful, an alternate scanner is used, or alphanumerical information is manually inputted to define packet 16.

If a single beep is heard, operator 10 is satisfied that the item is suitably processed, passes the item to a packaging station 19, and (if desired) proceeds to scan a subsequent item. Alternately, an invoice is raised using CPU 13.

If a double beep is heard, operator 10 first re-scans the item. If a double beep is again heard, operator 10 obtains further information from CPU 13. Following form this, it is typically either necessary to manually define packet 16, or obtain a "price check" for the item. In some cases this involves manually querying database 17, whilst in other cases a supervisor is contacted for assistance.

Whilst known prior art systems implement similar tone usages, the sound typically carries between consoles and is audible to multiple operators. This is known to cause confusion to operators (for example where an item is not read, and an operator inadvertently recognizes a tone from another console as indicating that the unread item had been read), and render supermarket checkout zones noisy and potentially irritating to customers. It will be appreciated that limiting the audibility of signal 9 to the respective zone 8 of the relevant device 1 substantially ameliorates such problems.

Other tone selections are implemented in other embodiments. The described embodiments use one or more simple beeps only to reduce the burden on transducer 7 and advantageously allow for a smaller and cheaper transducer to be used. Some known transducers are able to create clear crisp and complex sounds, however such applications are often demanding and require large expensive components. The present embodiment makes use of a relatively rudimentary and cut-down version of hypersonic sound technology where only a simple tone is required, and clarity is a minor concern. Indeed, provided audible tones are able to be conveyed without delay, other abilities are somewhat superfluous.

In other embodiments transducer 7 provides a more complex signal 9. For example, detailed instructions are provided from CPU 13 to operator 10. In some cases, where there are further possible outcomes—such as defined sub-categories of outcome C—detailed information regarding an experienced outcome is provided. One possibility is "the barcode read is not in an acceptable form", which indicates that a barcode was incorrectly read, or that a secondary barcode designed for other purposes was inadvertently read. Another possibility is "the barcode read does not match a known product", which indicates that, although barcode 15 is in an acceptable form, database 17 does not include a packet 18 for the packet 16 obtained by scanner 12 from barcode 15.

In some cases, device 1 is integrated with an intercom system. As such, an external party is able to personally address a selected operator 10 personally and individually, and consumers or other operators do not hear the address. This is useful in providing information to operators, such as "be informed that your lane will be closing in five minutes", "be informed that your lunch-break will be at 2 PM", or "the customer you are serving is suspected of shoplifting". Alternately, pre-requested pricing information is provided in relation to validation errors previously reported. The overall effect is that operator 10 is not incapacitated whilst being provided with information, and consumer 20 is not troubled—or indeed bombarded—with information that is not directly relevant for their purposes.

In some embodiments transducer 7 is manipulated to vary the location and/or size of zone 8. In some cases this is used to communicate information to a consumer. This information includes payment requests, advertising, and so on. It will be appreciated that such an approach is at times used to overcome language barriers that exist between an operator 10 and a consumer.

Insofar as advertising is concerned, in some cases a particular advertisement is selected on the basis of an item scanned. For example, the consumer is informed "thank you purchasing product X, be sure to SMS your product ID code to location Y for the chance to win prize Z". For such purposes, it is typically necessary to have an advertising transducer separate form the transducer 7, given that transducer 7 is continuously used for the benefit of operator 10. In such a case, signal 3 is indicative of packet 16, and processor 5 selectively designates an ultrasonic transmission indicative of appropriate advertising to be propagated by the advertising transducer. The process is somewhat similar to that shown in FIG. 5, however the "single beep" is replaced by the advertisement identified in packet 18, and the "double beep" is replaced by either no action or a default advertisement.

It will be appreciated that the above teachings are optimally implemented to provide a comparatively quiet supermarket checkout zone. This is advantageous to operators and consumers alike.

Although the present invention has been described with particular reference to certain preferred embodiments thereof, variations and modifications of the present invention can be effected within the spirit and scope of the following claims.

What is claimed is:

1. A feedback device including:
   an interface for receiving a first signal from a point of sale console;
   a processor responsive to the first signal for selectively defining a second signal; and
   an ultrasonic transducer responsive to the processor for propagating the second signal as an inaudible ultrasonic transmission to provide an audible signal to an operator of the point of sale console indicative of the first signal, the audible signal being focused towards the operator and being substantially inaudible to another operator of an adjacent point of sale console beyond a predetermined spatially defined transmission zone containing the operator.

2. A feedback device according to claim 1 wherein the first signal identifies a product and the audible signal is an advertisement related to the product and directed to a customer within the predetermined spatially defined transmission zone.

3. A feedback device according to claim 1 wherein the transducer outputs the ultrasonic transmission such that inherent properties of air within the transmission zone distort the ultrasonic transmission to provide the audible signal.

4. A feedback device according to claim 3 wherein the audible signal is substantially inaudible outside of the transmission zone.

5. A feedback device according to claim 1 wherein the transducer is mounted to the console.

6. A feedback device according to claim 1 wherein the transducer is spaced apart from the console.

7. A feedback device according to claim 1 wherein the console is operated from a control station defined in three-dimensional space, and the transmission zone includes at least part of the control station.

8. A feedback device according to claim 7 wherein the console and the adjacent console having a second control station are located within a common checkout zone, and the audible signal is not audible in the second control station.

9. A feedback device according to claim 1 wherein the console includes a scanner for reading identification tags, and the first signal is indicative of an identification tag having been read.

10. A feedback device according to claim 9 wherein the console includes a processing unit for validating the identification tag, and the first signal is indicative of the tag having been read and validated.

11. A feedback device according to claim 10 wherein the validation results in an approval or a rejection, and the audible signal is indicative of the approval or the rejection.

12. A method for providing feedback from a point of sale console, the method including the steps of:
    receiving a first signal from the point of sale console;
    being responsive to the first signal for selectively defining a second signal; and
    propagating the second signal as an inaudible ultrasonic transmission to provide an audible signal to an operator of the point of sale console indicative of the first signal, the audible signal being focused towards the operator and being substantially inaudible to another operator of an adjacent point of sale console beyond a predetermined spatially defined transmission zone containing the operator.

13. A scanner including:
    an identification system for scanning an item;
    an interface for receiving a first signal indicative of an item having been scanned;
    a processor responsive to the first signal for selectively defining a second signal; and
    an ultrasonic transducer responsive to the processor for propagating the second signal as an inaudible ultrasonic transmission to provide an audible signal to an operator of the scanner indicative of the first signal, the audible signal being focused towards the operator and being substantially inaudible to another operator to of an adjacent point of sale console beyond a predetermined spatially defined transmission zone containing the operator.

14. A scanner according to claim 13 wherein the scanning includes barcode recognition.

15. A scanner according to claim 13 wherein the scanning includes RFID tag interrogation.

* * * * *